United States Patent [19]

Baragar et al.

[11] Patent Number: 5,825,453
[45] Date of Patent: Oct. 20, 1998

[54] DOUBLE BAISED EYEGLASS NOSEPIECE

[75] Inventors: Marc Christopher Baragar, Vancouver; Michael John Roman, Burnaby, both of Canada

[73] Assignee: Xenophon Design Inc., Vancouver, Canada

[21] Appl. No.: 674,670

[22] Filed: Jul. 2, 1996

[30] Foreign Application Priority Data

Jul. 4, 1995 [CA] Canada .................................. 2153201

[51] Int. Cl.⁶ ...................................................... G02C 5/12
[52] U.S. Cl. .............................. 351/137; 351/55; 351/136
[58] Field of Search ............................. 351/55, 124, 128, 351/136, 137, 138, 140, 148

[56] References Cited

U.S. PATENT DOCUMENTS 2,825,266  3/1958  Kleinman ................................ 351/137

FOREIGN PATENT DOCUMENTS 2405490  6/1979  France ................................... 351/137

*Primary Examiner*—Huy Mai

[57] ABSTRACT

An eyeglass nosepiece is formed on a housing that defines two translational paths for guiding two independently travelling nosepads. The nosepads are free to travel between the top and bottom of each path, opposed only by resilient biasing means which absorb downward shock to the nosepiece and urge the nosepads upward and inward to grip the wearer's nose securely.

20 Claims, 10 Drawing Sheets

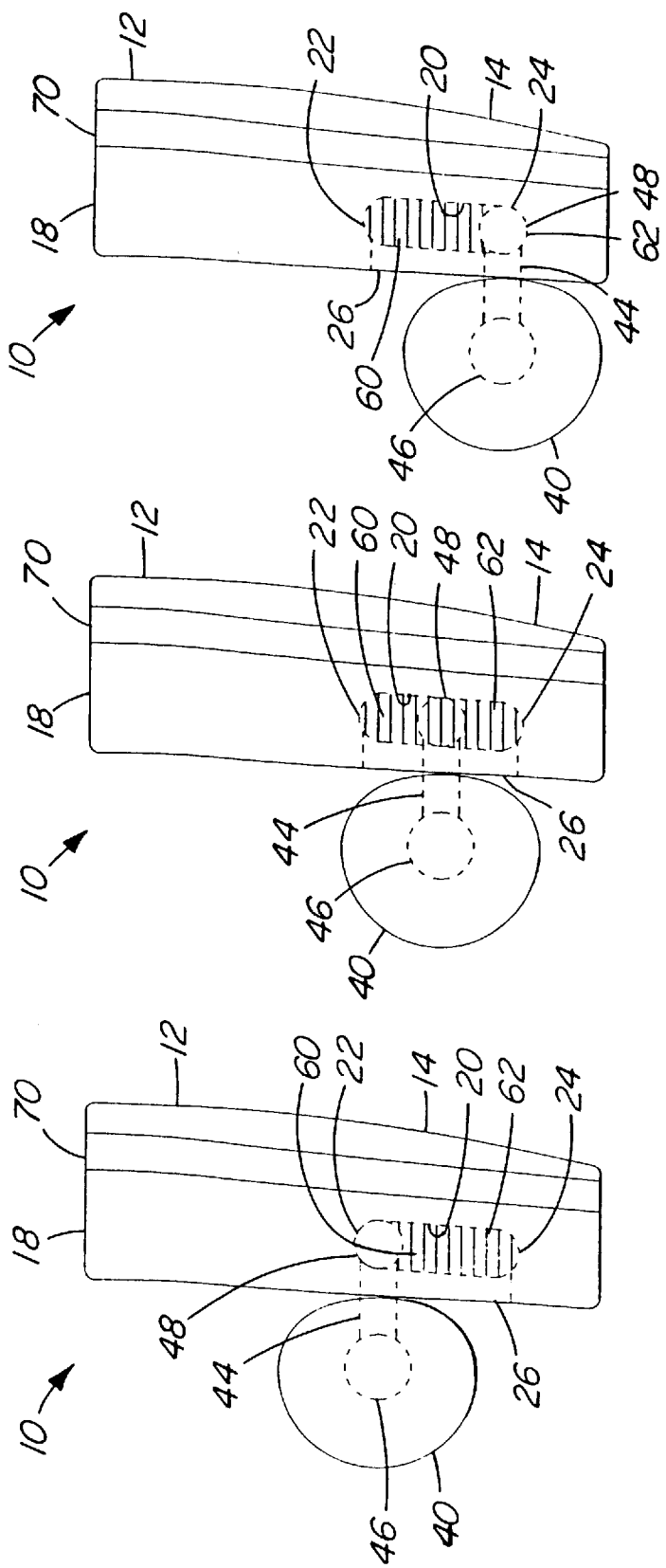

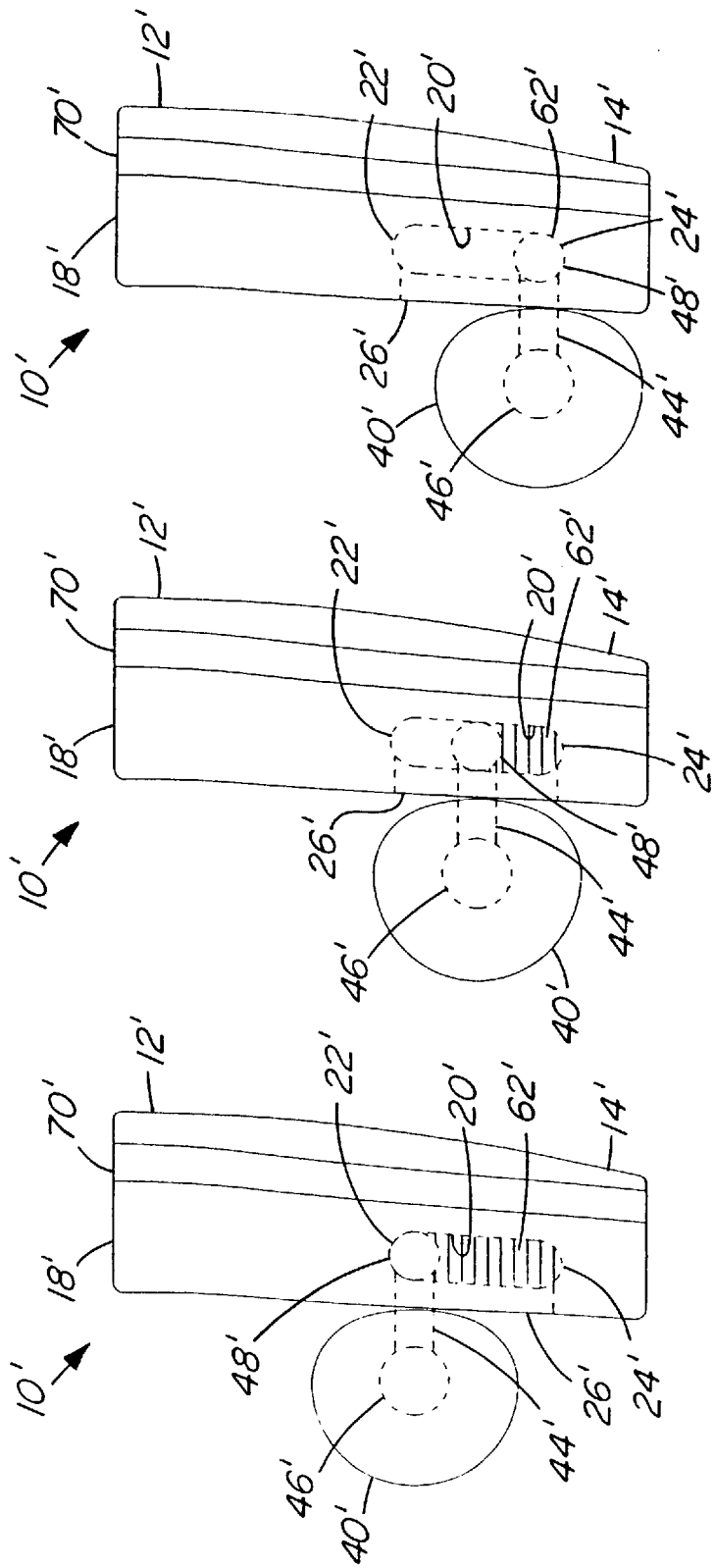

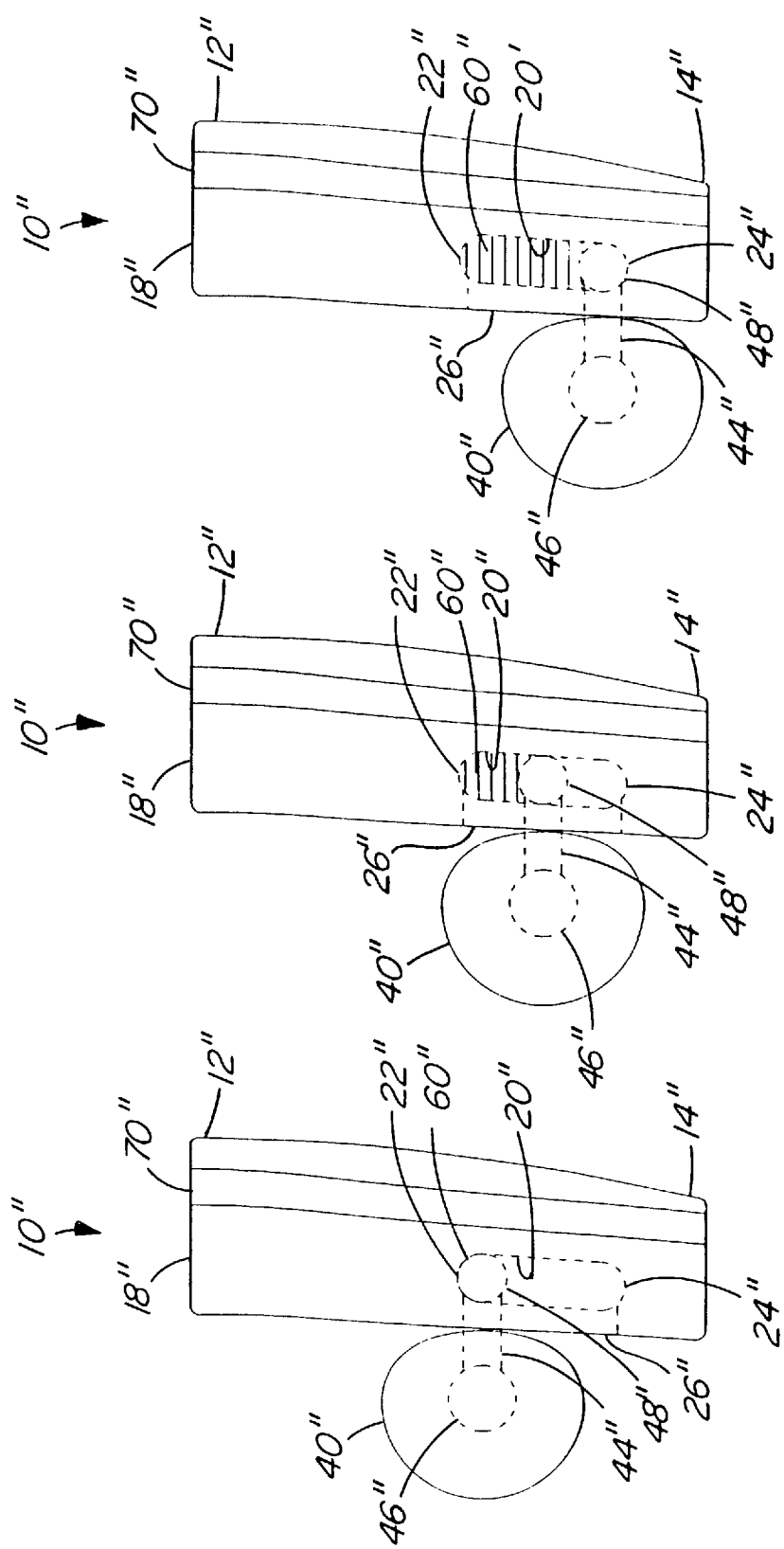

DOUBLE BAISED EYEGLASS NOSEPIECE

FIELD

This invention relates to nosepieces for eyeglasses, sunglasses, and the like. More specifically, it relates to nosepieces having spring biased nosepads.

BACKGROUND

The nosepiece of a pair of eyeglasses is fundamental in determining the overall comfort of the glasses. The challenge in building a nosepiece is to balance the flexibility needed to fit a wide variety of noses with the firmness needed to hold the glasses securely in place against the nose.

The conventional mechanism for balancing these two criteria has been a rigid nosepiece frame onto which a pair of rigid nosepads have been pivotally mount. In use, the nosepads pivot until they lie tangent to the wearer's nose, thereby transferring the normal forces from the nose directly onto the nosepiece frame while maximizing the surface area available to generate the frictional forces necessary to hold the nosepad, and hence the glasses, in place.

This conventional mechanism has disadvantages. In active, sweaty use, the friction between the nosepads and the nose decreases while the forces urging the glasses from the face become larger and strike more frequently. The workaround solution to this problem has generally been to use a strap to secure the glasses to the wearer's head during active use. Another disadvantage has been that, aside from the pivoting nosepad, there is little give in the mechanism other than possibly through adjustment with pliers. Besides limiting fitting adjustments, the limited give means that a blow to the glasses is more likely to damage either the glasses or the wearer's nose.

A number of nosepiece mechanisms have been proposed that use spring biasing to add a degree of adjustability and give to the frame or the nosepiece. U.S. Pat. No. 4,280,758 granted to Tom R. Flader in Jul. 1981 for "VERTICALLY ADJUSTABLE BIFOCAL EYE GLASSES" teaches a mechanism wherein a rigid nosepiece is connected to an eyeglass frame so as to be vertically slideable therewith, the slideable motion being biased downward by a pair of coil springs. The Flader mechanism is aimed at providing a pair of bifocal eyeglasses that can be vertically adjusted by applying a light downward force on the bridge of the glasses so as to compress the biasing springs and temporarily lower the frame with respect to the nosepiece. Although his mechanism produces a sprung system that may reduce impact damage, it does not improve nosepiece adjustability or the ability of the nosepiece to grip the wearer's face during wet or active use. U.S. Pat. No. 5,159,359 granted to Pascal Pauly et. al. on Oct. 27, 1992 for an "EYEGLASS FRAME WITH SPRING BIASED NOSE BRIDGE" teaches a similar mechanism that uses only one biasing spring. The Pauly mechanism suffers from the same disadvantages just mentioned with regard to the Flader mechanism.

A recent approach to mounting a nosepad on to the eyeglass frame has been to attach the nosepad to one end of a tightly wound coil spring and to attach the other end of the coil spring to the frame. The advantages of this exposed coil spring mechanism are good adjustability and significant give in the case of a blow to the glasses. However, the unsupported exposed springs are unlikely to supply suitable lateral resistance during active use and appear to be subject to easy deformation and damage.

What is needed is a nosepiece that strikes a suitable balance between adjustability, shock absorption, and secure fit during active use. The subject invention is directed to such a nosepiece.

SUMMARY

According to one aspect of the invention, there is provided an eyeglass nosepiece adapted to slideably receive first and second nosepads, comprising: a housing having: a first leg defining a path having a first end and a second end, the path being adapted to slideably receive the first nosepad for travel between the first end and the second end, a second leg defining a path having a first end and a second end, the path being adapted to slideably receive the second nosepad for travel between the first end and the second end, and a bridge portion connecting the first leg to the second leg thereby forming a concave-down frame. In a preferred embodiment, the nosepiece further comprises: first biasing means for applying a force substantially directed along the first path between the first end of the first path and the first nosepad, and second biasing means for applying a force substantially directed along the second path between the first end of the second path and the second nosepad. In a more preferred embodiment, the nosepiece further comprises: third biasing means for applying a force substantially directed along the first path between the second end of the first path and the first nosepad, and fourth biasing means for applying a force substantially directed along the second path between the second end of the second path and the second nosepad. In a most preferred embodiment, the first biasing means and the third biasing means are integrated portions of a piecewise or continuous whole. The path might be either a channel defined within and emerging from the first leg or an elongated runner. The first biasing means might be a spring such as coil spring, a leaf spring, it might be a resilient solid substantially occupying a portion of the channel proximate the first end or it might be a resilient tube substantially enveloping the elongated member proximate the first end.

According to another aspect of the invention, there is provided a pair of eyeglasses having a nosepiece adapted to slideably receive first and second nosepads, the nosepiece comprising: a housing having: a first leg defining a path having a first end and a second end, the path being adapted to slideably receive the first nosepad for travel between the first end and the second end, a second leg defining a path having a first end and a second end, the path being adapted to slideably receive the second nosepad for travel between the first end and the second end, and a bridge portion connecting the first leg to the second leg thereby forming a concave-down frame. In a preferred embodiment, the nosepiece further comprises: first biasing means for applying a force substantially directed along the first path between the first end of the first path and the first nosepad, and second biasing means for applying a force substantially directed along the second path between the first end of the second path and the second nosepad. In a more preferred embodiment, the nosepiece further comprises: third biasing means for applying a force substantially directed along the first path between the second end of the first path and the first nosepad, and fourth biasing means for applying a force substantially directed along the second path between the second end of the second path and the second nosepad. In a most preferred embodiment, the first biasing means and the third biasing means are integrated portions of a piecewise or continuous whole. The path might be either a channel defined within and emerging from the first leg or an elongated runner. The first biasing means might be a spring such as coil spring, a leaf spring, it might be a resilient solid substantially occupying a portion of the channel proximate the first end or it might be a resilient tube substantially enveloping the elongated member proximate the first end.

These and other features, aspects and advantages of the present invention will become better understood with reference to the following description, appended claims, and accompanying drawings, where:

BRIEF DESCRIPTION OF THE DRAWINGS

FIG. 2a is a side view of the nosepiece of FIG. 1a;

FIG. 2b is a side view of the nosepiece of FIG. 1b;

FIG. 2c is a side view of the nosepiece of FIG. 1c;

FIG. 3a is a top view of the nosepiece of FIG. 1a;

FIG. 5a is a side view of the nosepiece of FIG. 4a;

FIG. 5b is a side view of the nosepiece of FIG. 4b;

FIG. 5c is a side view of the nosepiece of FIG. 4c;

FIG. 6a is a top view of the nosepiece of FIG. 4a;

FIG. 8a is a side view of the nosepiece of FIG. 7a;

FIG. 8b is a side view of the nosepiece of FIG. 7b;

FIG. 8c is a side view of the nosepiece of FIG. 7c;

FIG. 9a is a top view of the nosepiece of FIG. 7a;

DESCRIPTION

Figure 1A:
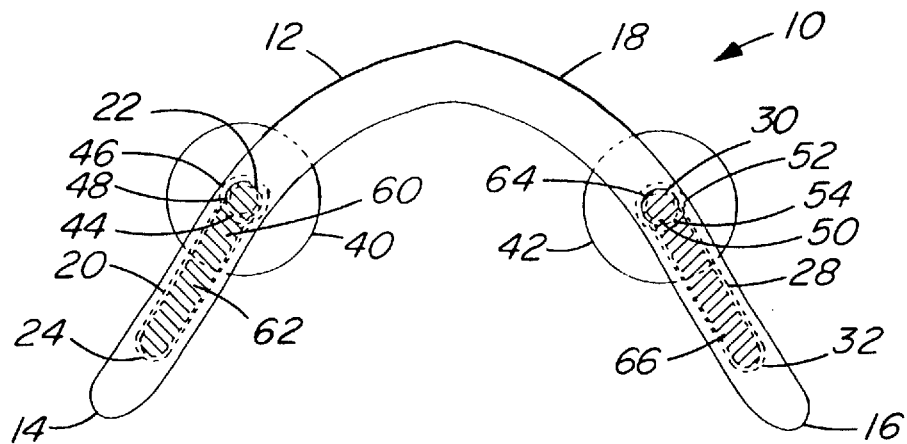
FIG. 1a is a front view of a nose piece embodying a first aspect of the invention, the nosepads being biased both upward and downward and being located at the top of their travel.
Figure 1B:
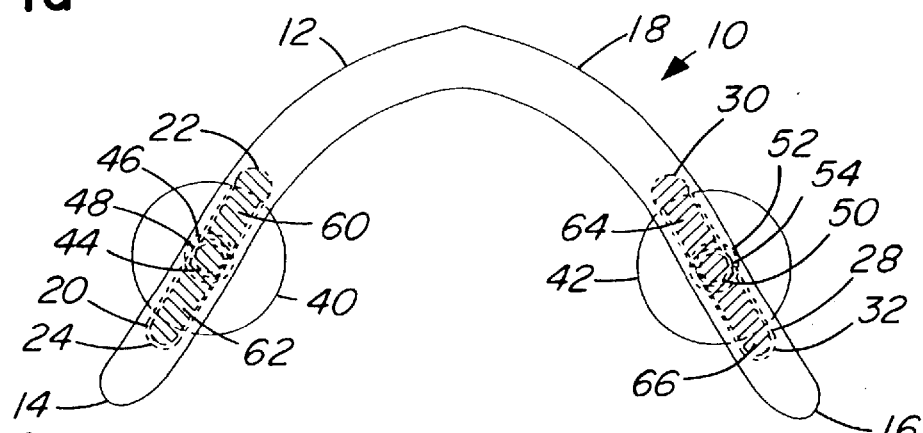
FIG. 1b is a front view of the nosepiece of FIG. 1a, the nosepads being located at the midpoint of their travel.
Figure 1C:
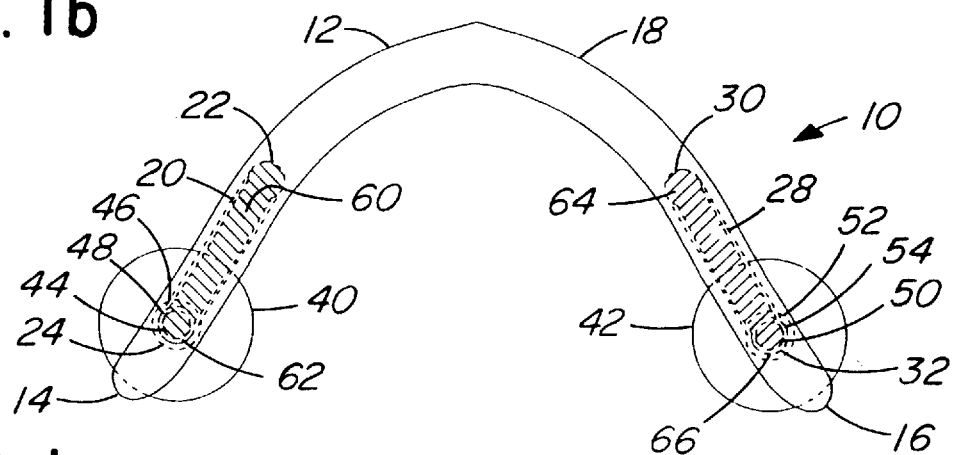
FIG. 1c is a front view of the nosepiece of FIG. 1a, the nosepads being located at the bottom of their travel.
Figure 3A:
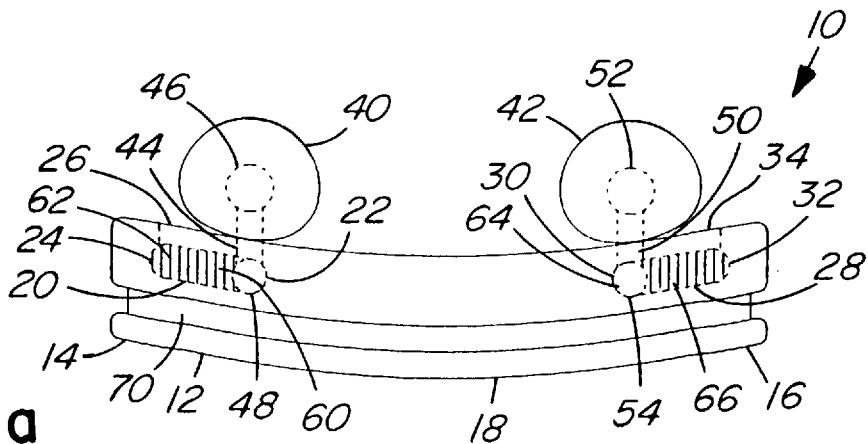
Figure 3B:
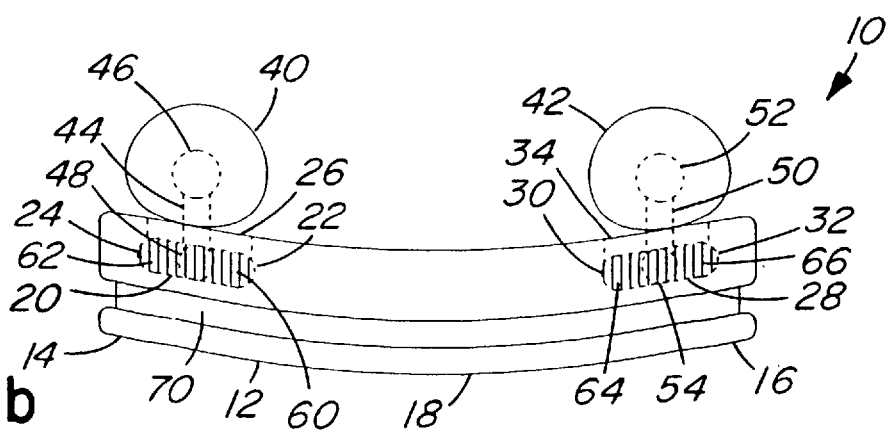
FIG. 3b is a top view of the nosepiece of FIG. 1b.
Figure 3C:
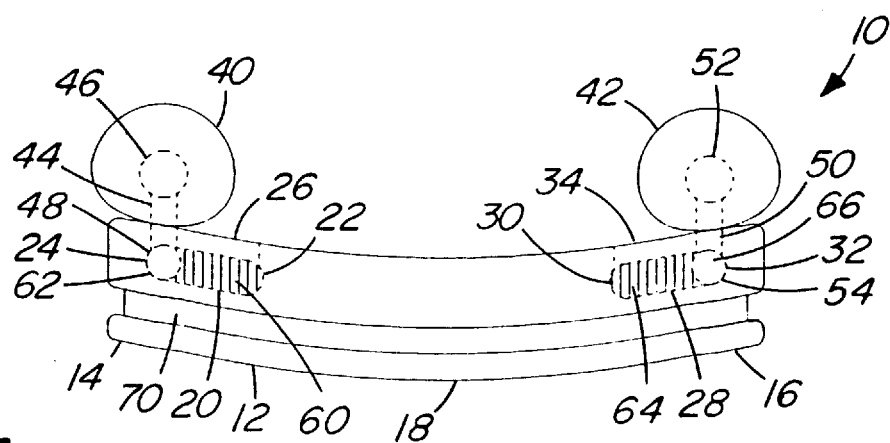
FIG. 3c is a top view of the nosepiece of FIG. 1c.

With reference now to FIGS. 1 through 3, a nosepiece embodying a first aspect of the invention is generally illustrated at 10. The nosepiece 10 includes a substantially inverted U-shaped housing 12 having a first leg 14, a second leg 16, and a bridge portion 18 connecting the first leg 14 to the second leg 16. The first leg 14, the second leg 16 and the bridge portion 18 may either be portions of an integral whole or discrete pieces connected together.

The first leg 14 defines a first channel 20 running substantially parallel to the longitudinal axis of the first leg 14, the first channel 20 having a first end 22 and a second end 24 and breaching the surface of the first leg 14 along its rearward face to define an aperture 26. The second leg 16 defines a second channel 28 running substantially parallel to the longitudinal axis of the second leg 16, the second channel 28 having a first end 30 and a second end 32 and breaching the surface of the second leg 16 along its rearward face to define an aperture 34. It should be recognized that the apertures 26, 34 could pass through the legs 14, 16 in locations other rearward faces of the legs 14, 16, and in particular could pass through the inward faces.

The nosepiece 10 further includes first and second nosepads 40, 42 which are preferably smooth curvilinear solids made of resilient, frictional material, such as some plastics or rubbers, and are adapted to comfortably grip the wearer's nose. A first extension member 44 has a first end 46 and a second end 48, the first end 46 being adapted to engage the first nosepad 40 and the second end 48 being adapted to be received through the aperture 26 of the first channel 20 and slideably engaged within the first channel 20 between its first end 22 and its second end 24. A second extension member 50 has a first end 52 and a second end 54, the first end 52 being adapted to engage the second nosepad 42 and the second end 54 being adapted to be received through the aperture 34 of the second channel 28 and slideably engaged within the second channel 28 between its first end 30 and its second end 32.

The means of engagement between the extension member 44, 50 and the nosepad 40, 42 may include a ball and socket joint, a compression fitting, or a chemical or fusion bond. Alternatively, the nosepad 40, 42 might be moulded around the first end 46, 52 of the extension member 44, 50 or may be integral with it.

The means of slideable engagement between the extension member 44, 50 and the channel 20, 28 may include a localized enlargement of the second end 48, 54 of the extension member 44, 50 in excess of the width of the aperture 26, 34, such enlargement possibly taking the form of a ball, spade, fork or blade. Alternatively, the extension member 44, 50 might define an annular channel proximate to its second end 48, 54 and adapted to engage the edges of the aperture 26, 34.

First downward biasing means 60 apply a force substantially parallel to the longitudinal axis of the first channel 20 between the first end of the channel 22 and the second end 48 of the first extension member 44. First upward biasing means 62 apply a force substantially parallel to the longitudinal axis of the first channel 20 between the second end of the channel 24 and the second end 48 of the first extension member 44. Second downward biasing means 64 apply a force substantially parallel to the longitudinal axis of the second channel 28 between the first end of the channel 30 and the second end 54 of the second extension member 50. Second upward biasing means 66 apply a force substantially parallel to the longitudinal axis of the second channel 28 between the second end of the channel 32 and the second end 54 of the second extension member 50.

The biasing means 60, 62, 64, 66 may be any resilient mechanism adapted to engage both a channel 20, 28 end 22, 24, 30, 32 and the second end 48, 54 of an extension member 44, 50 without otherwise interfering with the channel 20, 28, the nosepads 40, 44 or the housing 12. The biasing means 60, 62, 64, 66 might be a spring such as a coil spring or a leaf spring placed within the channel 20, 28 between one end 22, 24, 30, 32 and the second end 48, 54 of an extension member 44, 50. Alternatively, the biasing means 60, 62, 64, 66 might be a resilient material, such as some plastics or rubbers, sized and shaped to fully occupy a portion of the channel 20, 28 between one end 22, 24, 30, 32 and the second end 48, 54 of an extension member 44, 50.

In a particularly advantageous arrangement, the upward biasing means 62, 66 and the downward biasing means 60, 64 are integrated as portions of a piecewise or continuous biasing means. The second end 48, 54 of the extension member 44, 50 is adapted to engage the integrated biasing means at various set points so as to adjust the bias of the nosepads 40, 42 up or down. The adaptation of the second end 48, 54 of the extension member 44, 50 will differ according to the biasing means 60, 62, 64, 66 used. A spade, key or fork end would be suitable both for sliding unfettered beside a coil spring and for engaging specific coils for biasing. A pin or blade end would penetrate a resilient material for biasing and would be removable for adjustment. A resilient clip would grab a resilient material for biasing and would be removable for adjustment.

The housing 12 also includes means for connecting the nosepiece 10 to the frame of a pair of glasses (not shown). This connecting means is illustrated as a channel 70 although other means are contemplated such as a compression fitting, a chemical or fusion bond, or a unitary construction.

In operation, the wearer puts on the nosepiece 10 such that the nosepads 40, 42 comfortably grip his nose. The biasing means 60, 62, 64, 66 both absorb downward shock to the nosepiece 10 and adjust the nosepads 40, 42 to the size, shape and even asymmetry of the wearer's nose. The wearer can adjust the bias to alter the shock absorption and fit characteristics of the nosepiece 10. By increasing the downward bias, the wearer increases shock absorption ability because a larger spring is presented to absorb energy. By increasing the upward bias, the wearer urges the nosepads 40, 42 upward and generally inward to grip his nose and to pull the nosepiece 10 and hence the glasses (not shown) securely onto his face for active use.

Figure 4A:
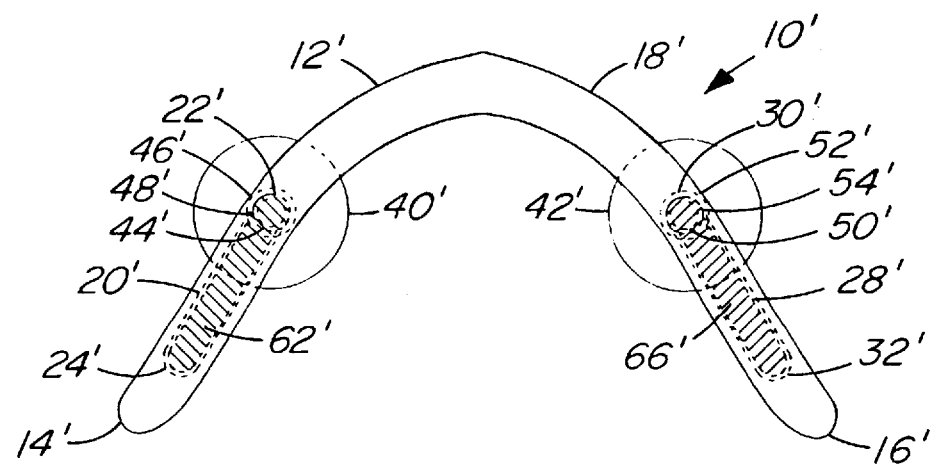
FIG. 4a is a front view of a nosepiece embodying a second aspect of the invention, the nosepads being biased in the upward direction and being located at the top of their travel.
Figure 4B:
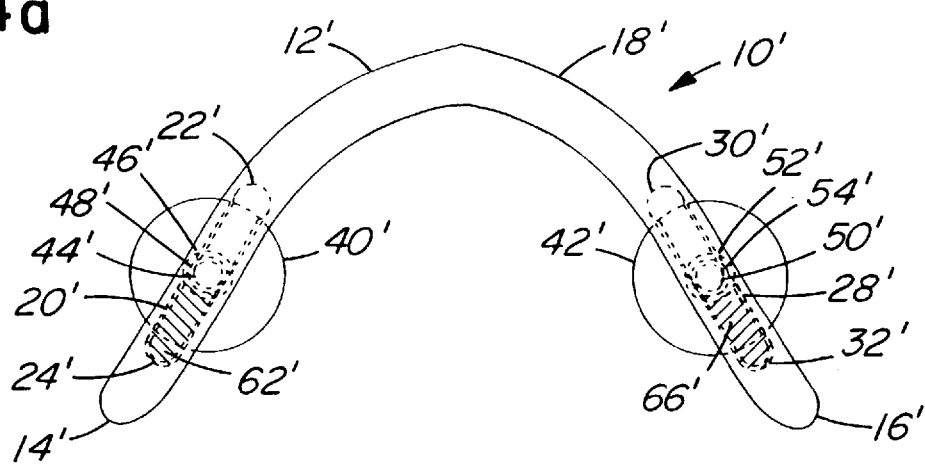
FIG. 4b is a front view of the nosepiece of FIG. 4a, the nosepads being located at the midpoint of their travel.
Figure 4C:
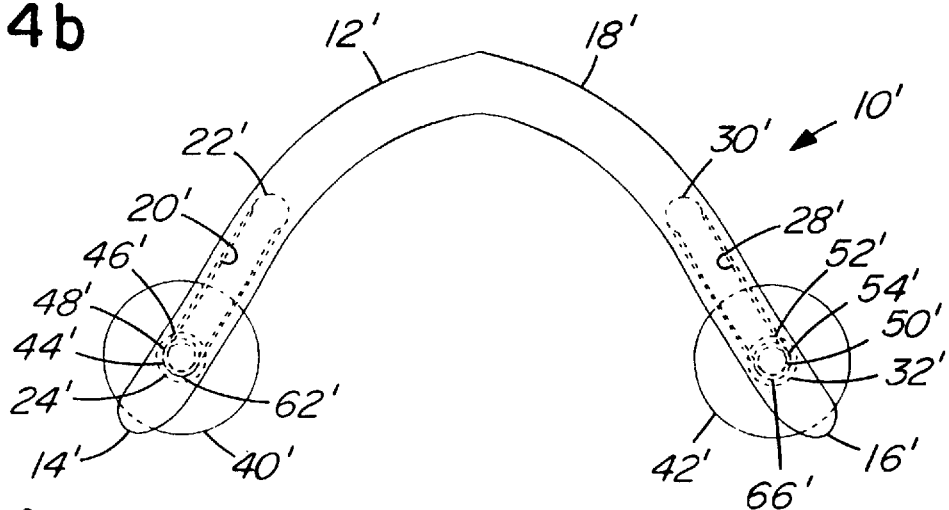
FIG. 4c is a front view of the nosepiece of FIG. 4a, the nosepads being located at the bottom of their travel.
Figure 6A:
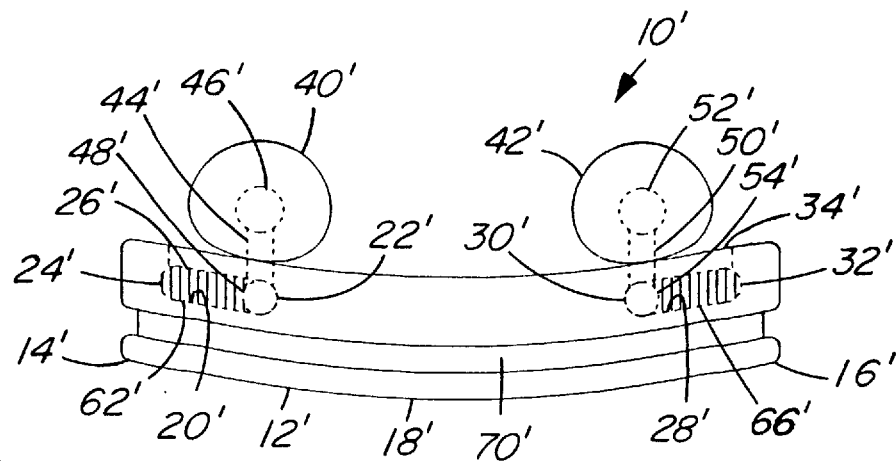
Figure 6B:
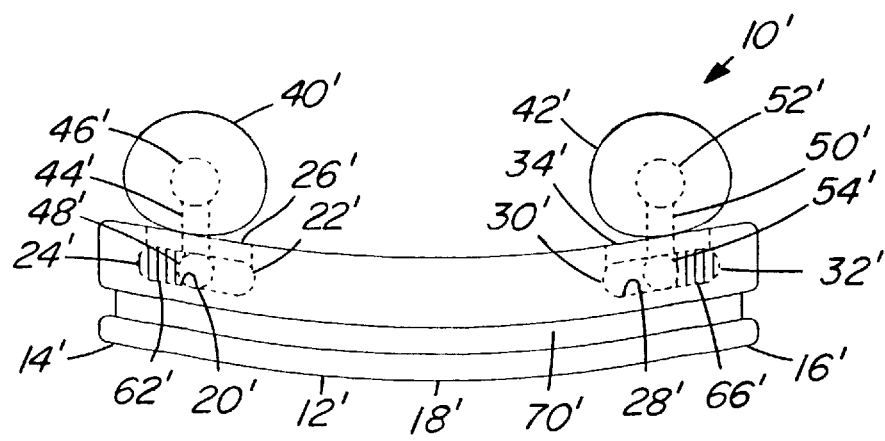
FIG. 6b is a top view of the nosepiece of FIG. 4b.
Figure 6C:
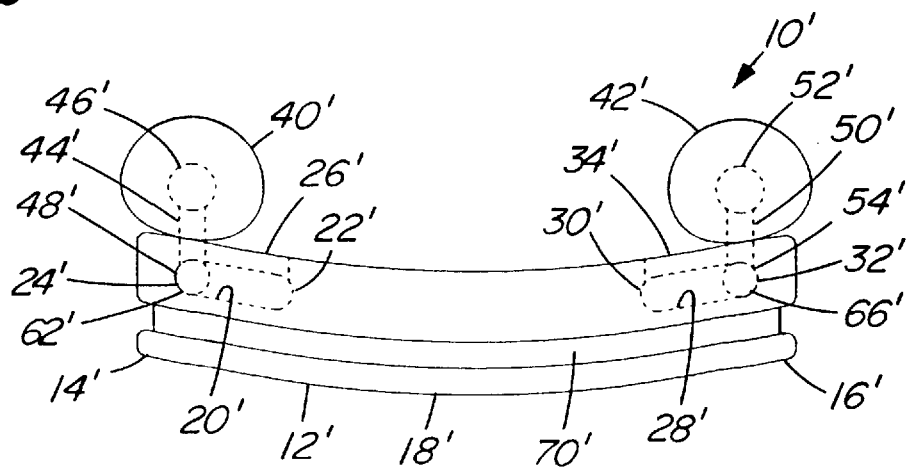
FIG. 6c is a top view of the nosepiece of FIG. 4c.

With reference now to FIGS. 4 through 6, a nosepiece embodying a second aspect of the invention is generally illustrated at 10'. The nosepiece 10' resembles the nosepiece 10 in all respects except that it lacks first and second downward biasing means. This nosepiece 10' is optimized to grip the nose of the user under wet and active adverse conditions.

Figure 7A:
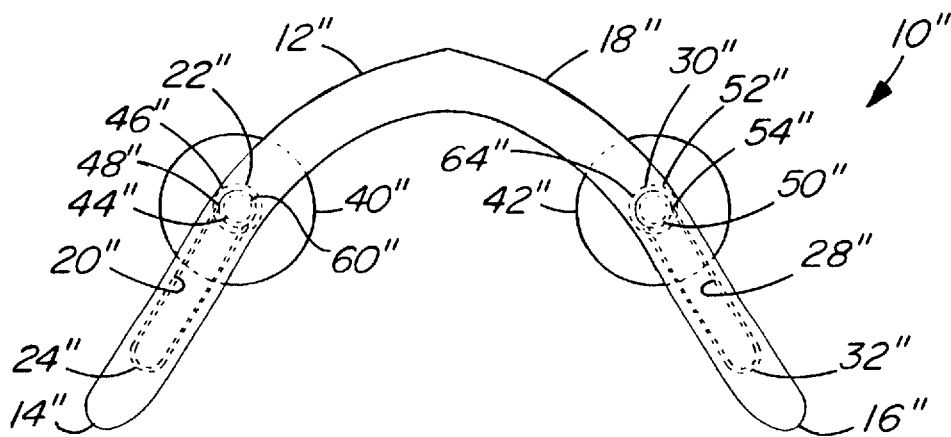
FIG. 7a is a front view of a nosepiece embodying a third aspect of the invention, the nosepads being biased in the downward direction and being located at the top of their travel.
Figure 7B:
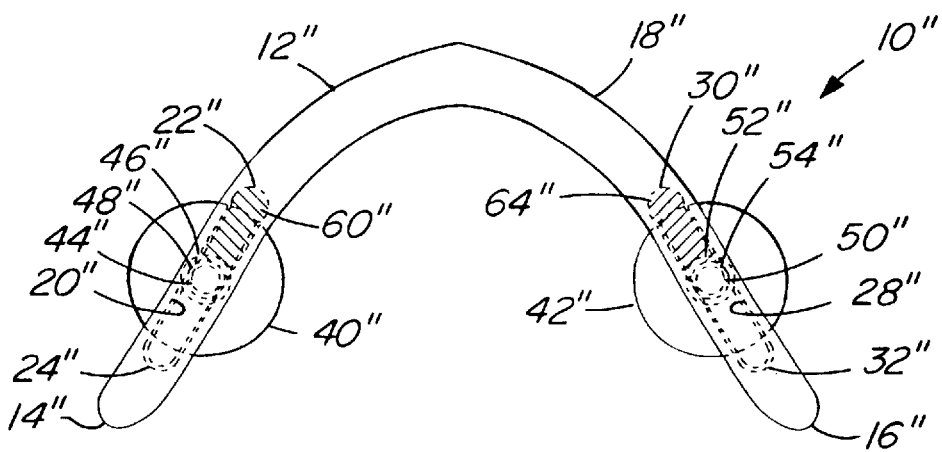
FIG. 7b is a front view of the nosepiece of FIG. 7a, the nosepads being located at the midpoint of their travel.
Figure 7C:
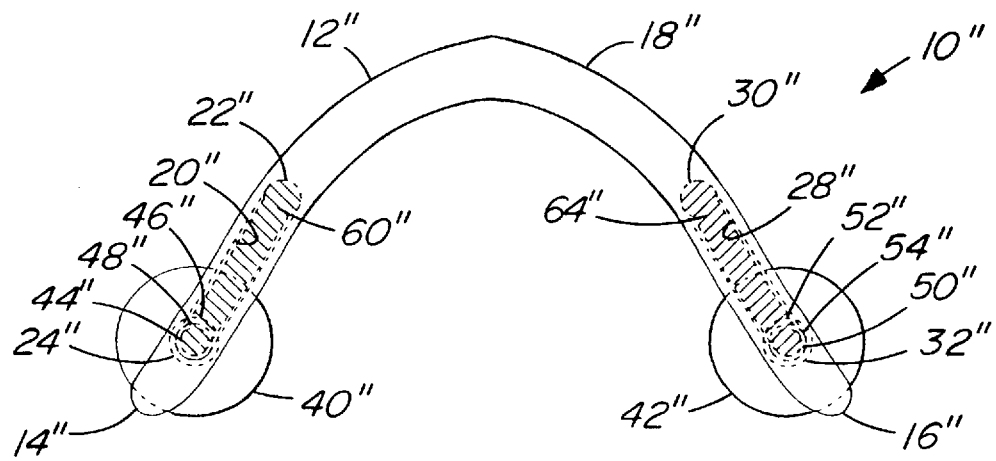
FIG. 7c is a front view of the nosepiece of FIG. 7a, the nosepads being located at the bottom of their travel.
Figure 9A:
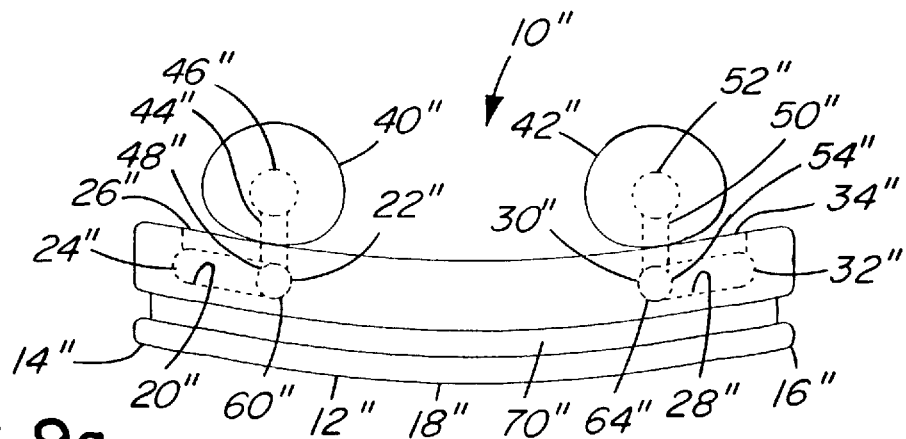
Figure 9B:
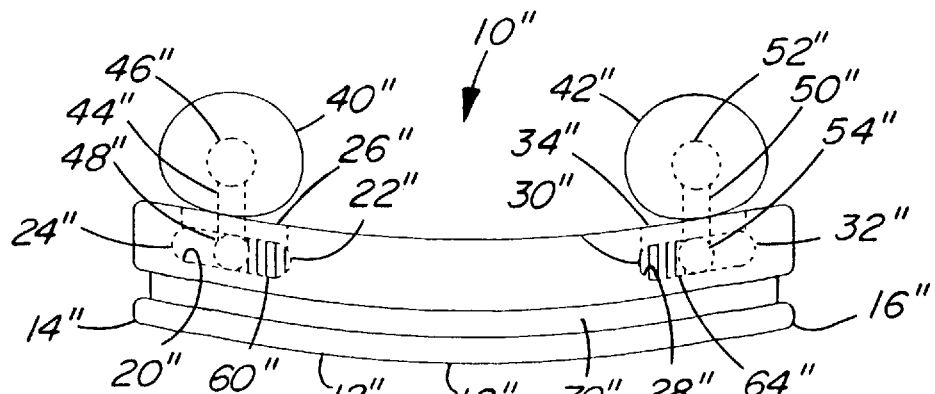
FIG. 9b is a top view of the nosepiece of FIG. 7b.
Figure 9C:
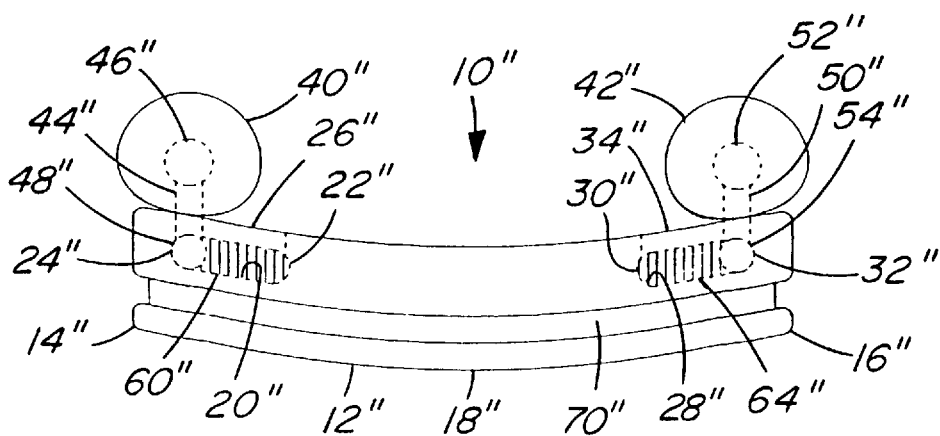
FIG. 9c is a top view of the nosepiece of FIG. 7c.

With reference now to FIGS. 7 through 9, a nosepiece embodying a third aspect of the invention is generally illustrated at 10". The nosepiece 10" resembles the nosepiece 10 in all respects except that it lacks first and second upward biasing means. This nosepiece 10" is optimized to provide shock absorption of downward blows to the nosepiece 10".

Figure 10:
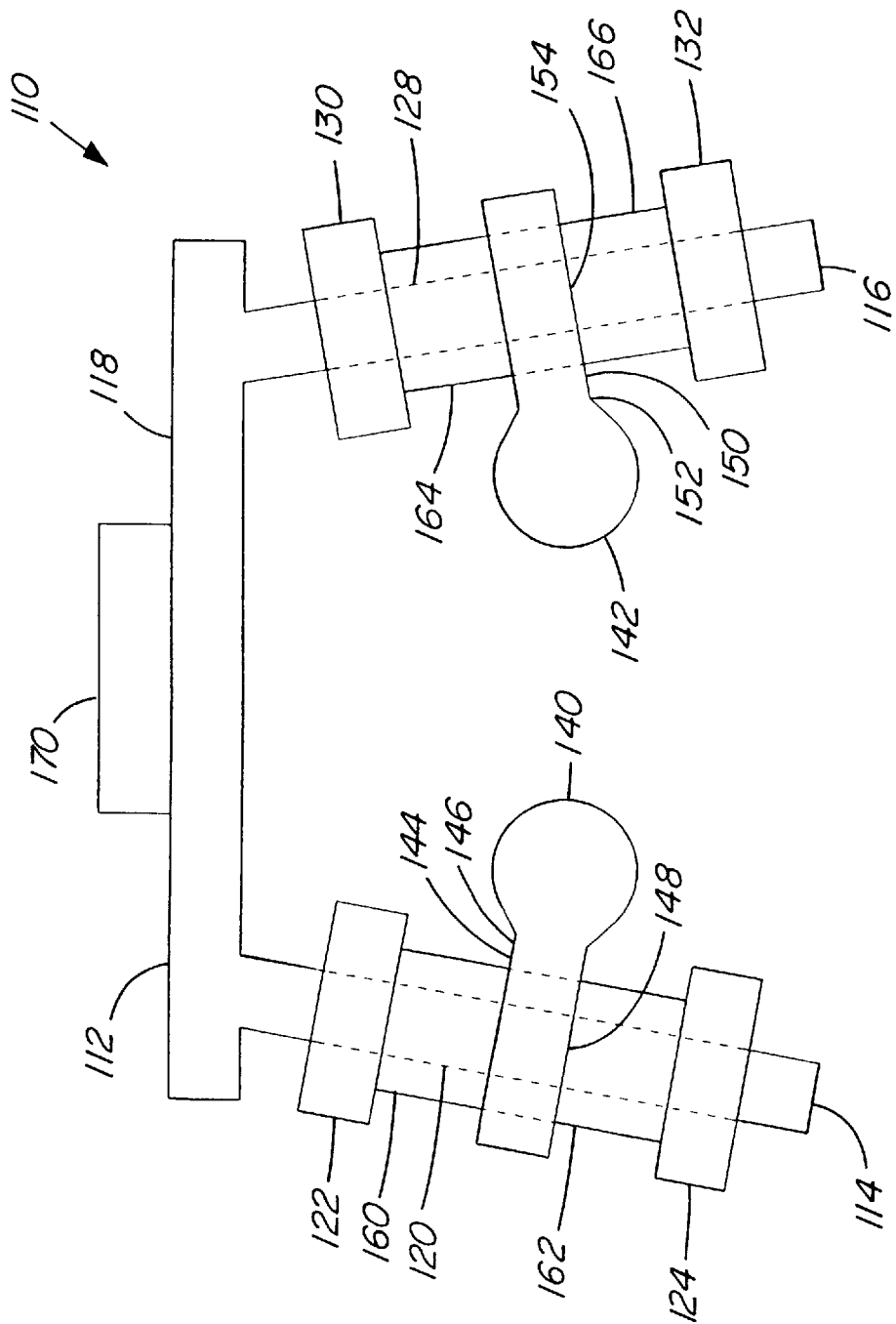
FIG. 10 is a front view of a nosepiece embodying a fourth aspect of the invention, the nosepads being biased both upward and downward and being located at the midpoint of their travel.

With reference now to FIG. 10, a nosepiece embodying a fourth aspect of the invention is generally illustrated at 110. The nosepiece 110 includes a substantially pi-shaped housing 112 having a first leg 114, a second leg 116, and a bridge portion 118 connecting the first leg 114 to the second leg 116. The first leg 114, the second leg 116 and the bridge portion 118 may either be portions of an integral whole or discrete pieces connected together.

The first leg 114 includes a first elongated runner 120 having a first stop 122 and a second stop 124. The second leg 116 includes a second elongated runner 128 having a first stop 130 and a second stop 132.

The nosepiece 110 further includes first and second nosepads 140, 142 which are preferably smooth curvilinear solids made of resilient, frictional material, such as some plastics or rubbers, and are adapted to comfortably grip the wearer's nose. A first extension member 144 has a first end 146 and a second end 148, the first end 146 being adapted to engage the first nosepad 140 and the second end 148 being adapted to be slideably engaged along the first runner 120 between its first stop 122 and its second stop 124. A second extension member 150 has a first end 152 and a second end 154, the first end 152 being adapted to engage the second nosepad 142 and the second end 154 being adapted to be slideably engaged along the second runner 128 between its first stop 130 and its second stop 132.

The means of engagement between the extension member 144, 150 and the nosepad 140, 142 may include a ball and socket joint, a compression fitting, or a chemical or fusion bond. Alternatively, the nosepad 140, 142 might be moulded around the first end 146, 152 of the extension member 144, 150 or may be integral with it.

The means of slideable engagement between the extension member 144, 150 and the runner 120, 128 may include key formed at the second end 148, 154 of the extension member 144, 150 adapted to slideably engage a channel following the runner 120, 128. Alternatively, the means of slideable engagement might include clip formed at the second end 148, 154 of the extension member 144, 150 adapted to slideably engage a track following the runner 120, 128.

First downward biasing means 160 apply a force substantially parallel to the longitudinal axis of the first runner 120 between the first stop 122 and the second end 148 of the first extension member 144. First upward biasing means 162 apply a force substantially parallel to the longitudinal axis of the first runner 120 between the second stop 124 and the second end 148 of the first extension member 144. Second downward biasing means 164 apply a force substantially parallel to the longitudinal axis of the second runner 128 between the first stop 130 and the second end 154 of the second extension member 150. Second upward biasing means 166 apply a force substantially parallel to the longitudinal axis of the second runner 128 between the second stop 132 and the second end 154 of the second extension member 150. The biasing means 160, 162, 164, 166 may be any resilient mechanism adapted to engage both a stop 122, 124, 130, 132 and the second end 148, 154 of an extension member 144, 150 without otherwise interfering with the runner 120, 128, the nosepads 140, 144 or the housing 112. The biasing means 160, 162, 164, 166 might be a spring such as a coil spring or a leaf spring placed around the runner 120, 128 between one stop 122, 124, 130, 132 and the second end 148, 154 of an extension member 144, 150. Alternatively, the biasing means 160, 162, 164, 166 might be a tube of resilient material, such as some plastics or rubbers, sized and shaped to fully envelop a portion of the runner 120, 128 between one stop 122, 124, 130, 132 and the second end 148, 154 of an extension member 144, 150.

In a particularly advantageous arrangement, the upward biasing means 162, 166 and the downward biasing means 160, 164 are integrated as portions of a piecewise or continuous biasing means. The second end 148, 154 of the extension member 144, 150 is adapted to engage the integrated biasing means at various set points so as to adjust the bias of the nosepads 140, 142 either up or down. The adaptation of the second end 148, 154 of the extension member 144, 150 will differ according to the biasing means 160, 162, 164, 166 used. A spade, key or fork end would be suitable both for sliding unfettered beside a coil spring and for engaging specific coils for biasing. A pin or blade end would penetrate a resilient material for biasing and would be removable for adjustment. A resilient clip would grab a resilient material for biasing and would be removable for adjustment.

The housing 112 also includes means for connecting the nosepiece 110 to the frame of a pair of glasses (not shown). This connecting means is illustrated as a clip 170 although other means are contemplated such as a compression fitting, a chemical or fusion bond, or a unitary construction.

Although specific embodiments of the present invention has been described and illustrated, the present invention is not limited to the features of these embodiments, but includes all variations and modifications within the scope of the claims.

For example, it is contemplated that there may be application for such a nosepiece wherein all biasing means are removed in favour of a suitably snug fit between the channel or runner and the nosepad extension member.

It is intended that the term eyeglasses as used in this patent also encompass sunglasses, goggles, and analogous items.

The embodiments of the invention in which an exclusive property or privilege is claimed are defined as follows:

1. An eyeglass nosepiece adapted to receive first and second nosepads, comprising:
   a) a first elongated member having a top end and a bottom end, and defining there-between a first path having a substantially parallel longitudinal axis, the first path being adapted to receive the first nosepad for translation there-along,
   b) a second elongated member having a top end and a bottom end, and adapted to receive the second nosepad,
   c) a bridge having a first end and a second end, the first end of the bridge being connected to first member toward its top end and the second end of the bridge being connected to the second member toward its top end thereby forming a concave-down frame, and
   d) a first biasing mechanism engaging the first elongated member and adapted to apply a force directed substantially along the first path to urge the first nosepad along the first path toward one end of the first elongated member.

2. An eyeglass nosepiece as in claim 1, wherein the first biasing means urges the first nosepad toward the bottom end of the first elongated member.

3. An eyeglass nosepiece as in claim 1, wherein the first biasing means urges the first nosepad toward the top end of the first elongated member.

4. An eyeglass nosepiece as in claim 1, further including a second biasing mechanism engaging the first elongated member and adapted to apply a force directed substantially along the first path to urge the first nosepad along the first path against the urging of the first biasing mechanism.

5. An eyeglass nosepiece as in claim 4, wherein the first biasing mechanism and the second biasing mechanism are integrated portions of a piecewise or continuous whole.

6. An eyeglass nosepiece as in claim 4, wherein the first path is a channel defined within the first elongated member, the channel being adapted to house the first and second biasing mechanisms and forming a substantially parallel elongated breach in a surface of the elongated member through which the first nosepad couples to the first and second biasing mechanisms.

7. An eyeglass nosepiece as in claim 4, wherein the surface of the first elongated member forms a runner defining the first path.

8. An eyeglass nosepiece as in claim 4, wherein the first biasing mechanism is resilient and occupies space on the first path between the first nosepad and one end of the elongated member.

9. An eyeglass nosepiece as in claim 8, wherein the first biasing mechanism is a spring.

10. An eyeglass nosepiece as in claim 1, wherein the second elongated member defines between its top and bottom ends a second path having a longitudinal axis substantially parallel to that of the second elongated member itself, the second path being adapted to receive the second nosepad for translation there-along, the eyeglass nosepiece further comprising:
    a) a third biasing mechanism engaging the second elongated member and adapted to apply a force directed substantially along the second path to urge the second nosepad along the second path toward one end of the second elongated member,
    b) a fourth biasing mechanism engaging the second elongated member and adapted to apply a force directed substantially along the second path to urge the second nosepad along the second path against the urging of the third biasing mechanism.

11. A pair of eyeglasses having a nosepiece adapted to receive first and second nosepads, the nosepiece comprising:
    a) a first elongated member having a top end and a bottom end, and defining there-between a first path having a substantially parallel longitudinal axis, the first path being adapted to receive the first nosepad for translation there-along,
    b) a second elongated member having a top end and a bottom end, and adapted to receive the second nosepad,
    c) a bridge having a first end and a second end, the first end of the bridge being connected to first member toward its top end and the second end of the bridge being connected to the second member toward its top end thereby forming a concave-down frame, and
    d) a first biasing mechanism engaging the first elongated member and adapted to apply a force directed substantially along the first path to urge the first nosepad along the first path toward one end of the first elongated member.

12. A pair of eyeglasses as in claim 11, wherein the first biasing means urges the first nosepad toward the bottom end of the first elongated member.

13. A pair of eyeglasses as in claim 11, wherein the first biasing means urges the first nosepad toward the top end of the first elongated member.

14. A pair of eyeglasses as in claim 11, further including a second biasing mechanism engaging the first elongated member and adapted to apply a force directed substantially along the first path to urge the first nosepad along the first path against the urging of the first biasing mechanism.

15. A pair of eyeglasses as in claim 14, wherein the first biasing mechanism and the second biasing mechanism are integrated portions of a piecewise or continuous whole.

16. A pair of eyeglasses as in claim 14, wherein the first path is a channel defined within the first elongated member, the channel being adapted to house the first and second biasing mechanisms and forming a substantially parallel elongated breach in a surface of the elongated member through which the first nosepad couples to the first and second biasing mechanisms.

17. A pair of eyeglasses as in claim 14, wherein the surface of the first elongated member forms a runner defining the first path.

18. A pair of eyeglasses as in claim 14, wherein the first biasing mechanism is resilient and occupies space on the first path between the first nosepad and one end of the elongated member.

19. A pair of eyeglasses as in claim 18, wherein the first biasing mechanism is a spring.

20. A pair of eyeglasses as in claim 11, wherein the second elongated member defines between its top and bottom ends a second path having a longitudinal axis substantially parallel to that of the second elongated member itself, the second path being adapted to receive the second nosepad for translation there-along, the eyeglass nosepiece further comprising:
   a) a third biasing mechanism engaging the second elongated member and adapted to apply a force directed substantially along the second path to urge the second nosepad along the second path toward one end of the second elongated member,
   b) a fourth biasing mechanism engaging the second elongated member and adapted to apply a force directed substantially along the second path to urge the second nosepad along the second path against the urging of the third biasing mechanism.

\* \* \* \* \*